(12) United States Patent
Nakamura

(10) Patent No.: US 8,053,098 B2
(45) Date of Patent: Nov. 8, 2011

(54) POWER STORAGE UNIT THAT EFFECTIVELY CONTROLS PRESSURE AND VEHICLE

(75) Inventor: Yoshiyuki Nakamura, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 737 days.

(21) Appl. No.: 12/213,842

(22) Filed: Jun. 25, 2008

(65) Prior Publication Data

US 2009/0004553 A1 Jan. 1, 2009

(30) Foreign Application Priority Data

Jun. 27, 2007 (JP) .................................. 2007-168402

(51) Int. Cl.
 *H01M 2/12* (2006.01)
(52) U.S. Cl. ........................................... 429/54; 429/53
(58) Field of Classification Search .................... 429/43, 429/54, 71, 72–89
 See application file for complete search history.

(56) References Cited

U.S. PATENT DOCUMENTS 6,042,960 A * 3/2000 DaCosta et al. ................. 429/53

FOREIGN PATENT DOCUMENTS

| JP | A-9-17401 | 1/1997 |
| JP | A-10-247513 | 9/1998 |
| JP | A-2001-60466 | 3/2001 |
| JP | A-2001-307691 | 11/2001 |
| JP | A-2003-51298 | 2/2003 |

* cited by examiner

*Primary Examiner* — Barbara Gilliam
*Assistant Examiner* — Maria J Laios
(74) *Attorney, Agent, or Firm* — Oliff & Berridge, PLC

(57) ABSTRACT

A power storage unit has: a plurality of power storage modules each constituted of a power generation element which in a power generation element case containing the power generation element; and a power storage unit case containing the power storage modules and an insulative liquid, wherein at least two of the power storage modules have a first valve that switches from a closed state to an open state in response to the pressure in the power generation element case increasing up to a first threshold and a second valve that switches from a closed state to an open state in response to the pressure at the outside of the power generation element case increasing up to a second threshold.

12 Claims, 3 Drawing Sheets

POWER STORAGE UNIT THAT EFFECTIVELY CONTROLS PRESSURE AND VEHICLE

INCORPORATION BY REFERENCE

The disclosure of Japanese Patent Application No. 2007-168402 filed on Jun. 27, 2007 including the specification, drawings and abstract is incorporated herein by reference in its entirety.

BACKGROUND OF THE INVENTION

1. Field of the Invention

The invention relates to a power storage unit having a case, a plurality of power storage modules provided in the case, and an insulative liquid provided in the case. The invention relates also to a vehicle incorporating such a power storage unit.

2. Description of the Related Art

A typical battery pack is constituted of a plurality of battery cells (e.g., secondary batteries) electrically connected in series and disposed in a battery pack case. For example, a battery pack is known which has a battery pack case containing an insulative oil to facilitate the heat radiation from the battery cells and to insulate the battery cells from each other (Refer to Japanese Patent Application Publications No. 10-247513 (JP-A-10-247513), No. 2001-307691 (JP-A-2001-307691), No. 2001-60466 (JP-A-2001-60466), No. 2003-51298 (JP-A-2003-51298), and No. 09-17401 (JP-A-09-17401)).

Each battery cell is constituted of a battery case and a power generation element disposed in the battery case. In the event of an abnormality of the battery cell (e.g., when the battery cell is overcharged), gas may be produced by the power generation element in the battery cell. In view of this, there are battery cells having a valve for discharging the gas produced by the power generation element to the outside of the battery case. Note that the power generation element of each battery cell is constituted of a positive electrode plate, a negative electrode plate, and an electrolyte solution, and it is charged and discharged as needed.

In a battery pack having battery cells with the valves described above, in the event of an abnormality of any battery cell, gas is produced in said battery cell and then discharged therefrom. At this time, part of the power generation element (i.e., part of the electrolyte solution) in the battery cell may leak to the outside together with the gas. Although the battery pack case is filled with the insulative oil and therefore the respective battery cells are insulated from each other as mentioned above, if the electrolyte solution leaks to the outside of any battery cell, the insulation of the insulative oil weakens accordingly.

If the insulation of the insulative oil weakens, it may cause current to flow between the battery cell producing the gas and other battery cells, and this increases the temperature of each battery cell. An increase the temperature of each battery cell induces gas production therein, causing the valve at each battery cell to open.

As such, if the valve of any battery cell is opened, it may cause the valves of other battery cells to be opened. In this case, the pressure in the battery pack case increases excessively.

One option to solve this issue is to form the battery pack case to be strong enough to withstand such a pressure increase or to provide a gas guide mechanism for guiding the gas in the battery pack case to the outside.

However, increasing the strength of the battery pack case inevitably results in complication of the structure of the battery pack case, which leads to enlargement of the battery pack, or in a heavier weight of the battery pack case. Further, having a gas guide mechanism inevitably results in enlargement of the battery pack for accommodating said mechanism, which reduces the freedom in arranging the battery pack.

For example, such enlargement of the battery pack is not desirable especially in a case where the battery pack is mounted in a vehicle because it may result in enlargement of the vehicle, or the like.

SUMMARY OF THE INVENTION

The first aspect of the invention relates to a power storage unit, having: a plurality of power storage modules each constituted of a power generation element which in a power generation element case containing the power generation element; and a power storage unit case containing the power storage modules and an insulative liquid, wherein at least two of the power storage modules have a first valve that switches from a closed state to an open state in response to the pressure in the power generation element case increasing up to a first threshold and a second valve that switches from a closed state to an open state in response to the pressure at the outside of the power generation element case increasing up to a second threshold.

The second aspect of the invention relates to a vehicle incorporating the power storage unit according to the first aspect of the invention.

According to the invention, for example, when gas is produced in any power storage module (i.e., the power generation element case), the first valve opens to discharge the gas to the outside of the power generation element case (i.e., into the interior of the power storage unit case), and on the other hand, the second valve opens as the pressure in the power storage unit case thus increases.

When the second valve thus opens, the insulative liquid enters the power storage module and contacts the power generation element therein, resulting in an increase in the internal resistance of the power storage module, and it suppresses gas production in said power storage module.

As such, because gas production at each power storage module may be thus suppressed, the structure of the power storage unit case may be simplified and thus its weight may be reduced. Thus, the power storage unit may be made more compact in size and lighter in weight.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE EMBODIMENTS

Figure 1:
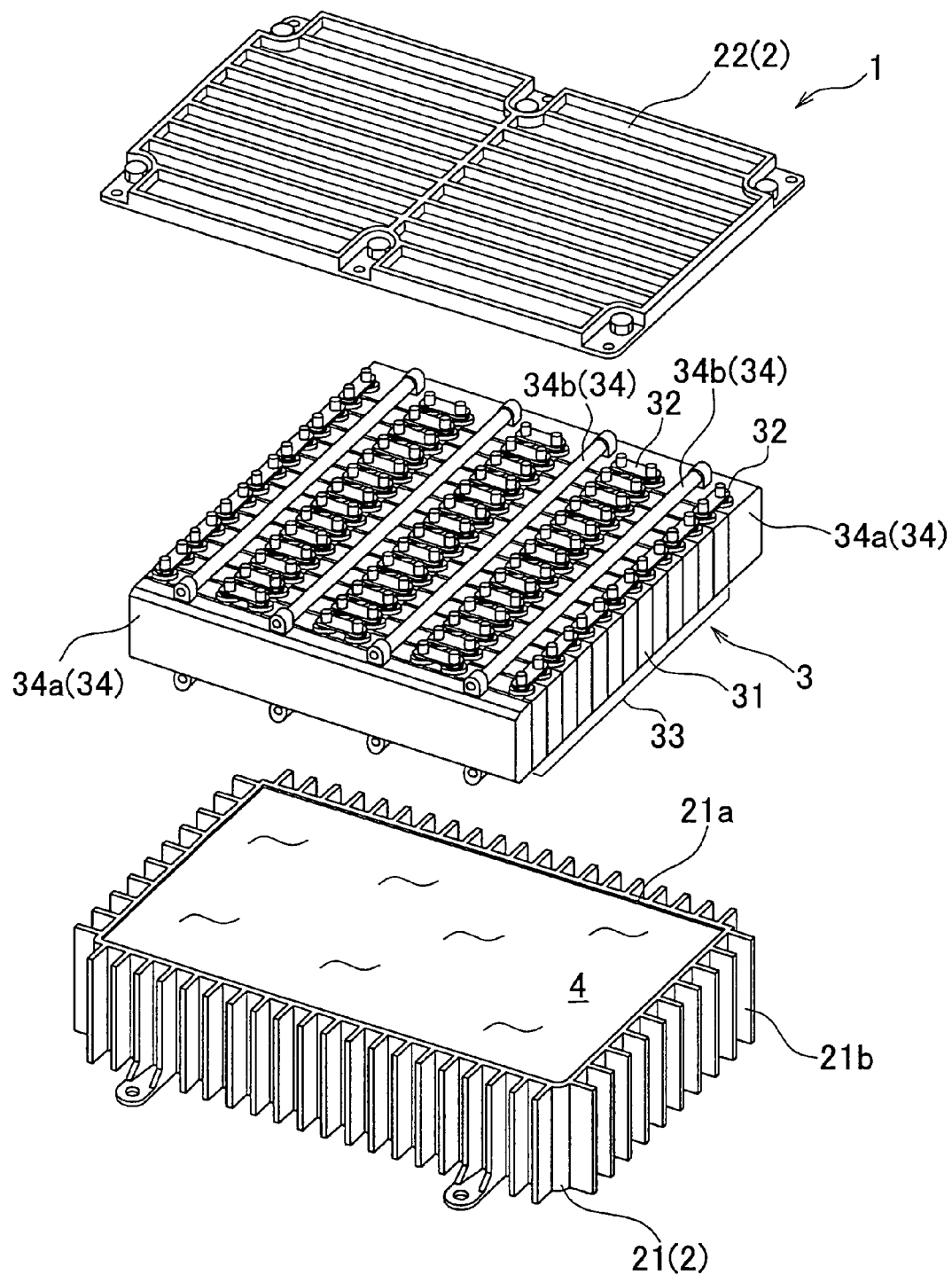
FIG. 1 is an exploded perspective view of a battery pack according to an example embodiment of the invention.

First, the structure of a battery pack 1 ("power storage unit") according to the example embodiment of the invention will be described with reference to FIG. 1. FIG. 1 is an exploded perspective view of the battery pack 1. This battery pack 1 is adapted to be mounted in a vehicle.

The battery pack 1 is constituted of a battery pack case 2 ("power storage unit case"), a battery unit 3 disposed in the battery pack case 2, and an insulative oil 4. The battery pack case 2 is constituted of a container 21 defining a space for storing the power storage assembly 3 and the insulative oil 4 and a lid member 22 covering an opening 21a of the container 21.

Provided on the outer side face of the container 21 are radiation fins 21b for facilitating heat radiation from the battery pack 1 (i.e., the heat radiation from the battery unit 3). Note that the radiation fins 21b may be omitted if appropriate. The lid member 22 is fixed to the container 21 using fasteners, such as bolts, which are not shown in the drawings, whereby the interior of the battery pack case 2 is hermetically closed. The container 21 is fixed to a vehicle body member (e.g., floor panel, frame) using fasteners, such as bolts, which are not shown in the drawings. Preferably, the battery pack case 2 is made of a material having a high durability and a high corrosion resistance, such as aluminum.

The battery unit 3 disposed in the container 21 has a battery assembly 33 constituted of a plurality of battery cells 31 electrically connected in series to each other via bus bars 32 and a cramping mechanism 34 cramping the battery assembly 33 from both sides. The cramping mechanism 34 has cramping members 34a cramping the battery assembly 33 from both sides and links 34b by which the cramping members 34a are linked to each other. The battery unit 3 is fixed in position in the container 21.

The insulative oil 4 is, for example, silicon oil. While the insulative oil 4 is used in this example embodiment, inactive liquid may alternatively be used instead of the insulative oil. Inactive liquids are insulative. For example, fluorine inactive fluids, such as Fluorinert, NovecHFE (hydro-fluoro-ether) and Novec1230 (Product of Minnesota Mining & Manufacturing Co. (3M)), may be used.

Figure 2:
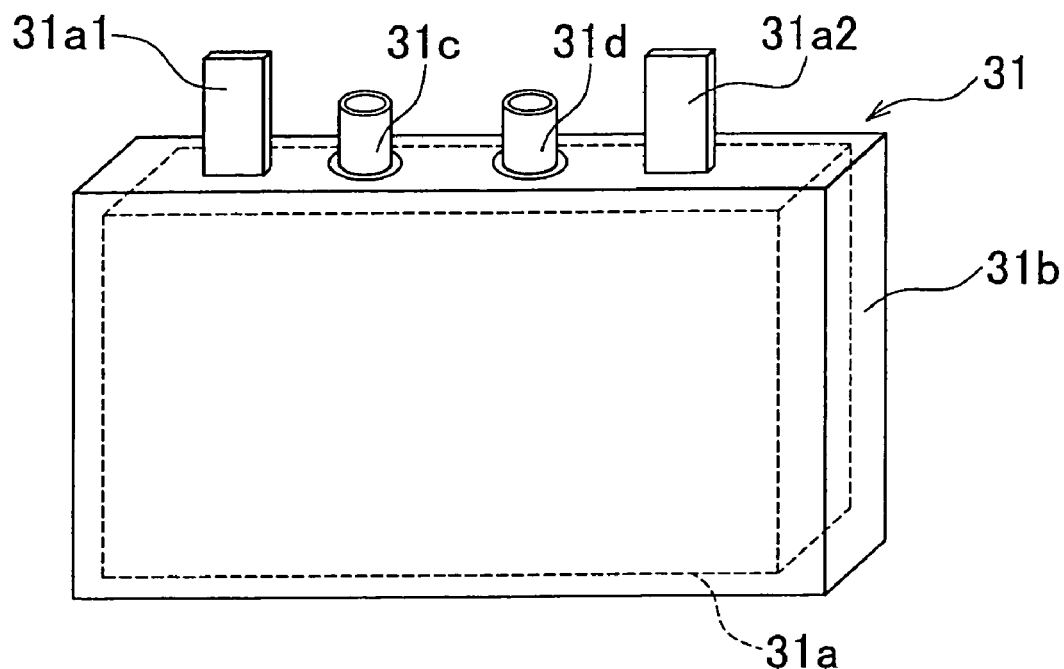
FIG. 2 is a perspective view showing the exterior of each battery cell according to the example embodiment of the invention.

Next, the structure of each battery cell 31 of the battery assembly 33 will be described in detail with reference to FIG. 2. FIG. 2 is a perspective view showing the exterior of the battery cell 31.

Referring to FIG. 2, the battery cell 31 is constituted of a power generation element 31a, which will be described in detail later, a battery case 31b for storing the power generation element 31a, and first and second valves 31c, 31d both provided in the battery case 31b. The battery case 31b is made from, for example, laminates, or the like.

A positive terminal 31a1 and a negative terminal 31a2 are provided at the power generation element 31a, which partially protrude from the battery case 31b. The positive terminal 31a1 and the negative terminal 31a2 of each battery cell 31 are connected electrically, and mechanically, to the positive terminal 31a1 and the negative terminal 31a2 of other battery cell via the bus bars 32 shown in FIG. 1.

Figure 3:
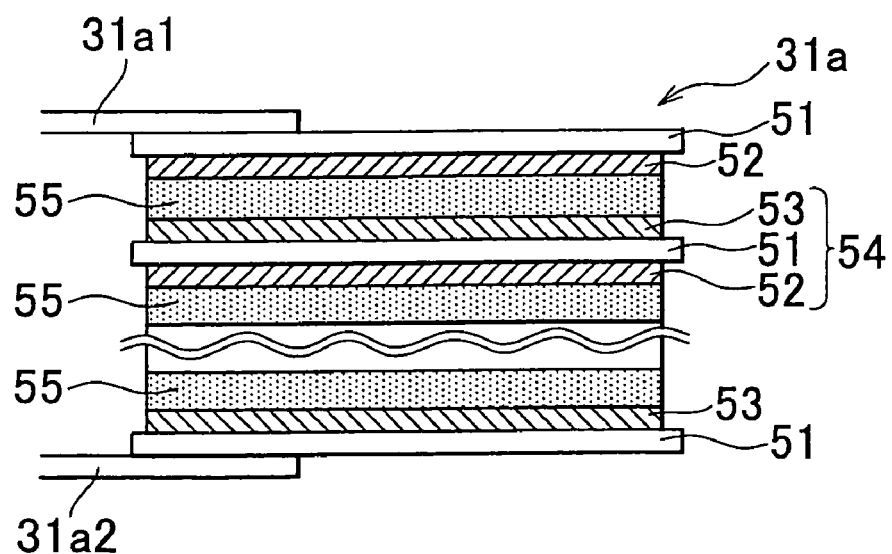
FIG. 3 is a cross-sectional view showing the structure of each power generation element according to the example embodiment of the invention.

Next, the structure of the power generation element 31a will be described with reference to FIG. 3. FIG. 3 is a cross-sectional view schematically showing the structure of the power generation element 31a.

A positive electrode layer ("electrode layer") 52 is formed on one side of each power collector 51 and a negative electrode layer ("electrode layer") 53 is formed on the other side. Thus, these electrode layers (the positive electrode layer 52 and the negative electrode layer 53) and the power collector 51 together constitute a bipolar electrode 54. When forming the electrode layers (the positive electrode layer 52 and the negative electrode layer 53), they may be formed on the power collector 51 using an ink-jet method, or the like.

An electrolyte layer 55 is provided between two bipolar electrodes 54. The electrolyte layer 55 is in contact with the positive electrode layer 52 of the bipolar electrode 54 on one side and in contact with the negative electrode layer 53 of the bipolar electrode 54 on the other side. Thus, the power generation element 31a is constituted of the bipolar electrodes 54 and the electrolyte layers 55 that are alternately stacked on top of each other.

While the power generation element 31a of this example embodiment of the invention has a stack structure as shown in FIG. 3, it may be structured otherwise. For example, the power generation element 31a may be constituted of bipolar electrodes 54 and electrolyte layers 55 rolled up together.

The power collectors 51 located at the both ends of the power generation element 31a in the direction in which the components of the power generation element 31a are stacked (will be referred to as "stacking direction" or "vertical direction in FIG. 3" where necessary) have an electrode layer (the positive electrode layer 52 or the negative electrode layer 53) only on one side, and electrode terminals (the positive terminal 31a1 and the negative terminal 31a2) are electrically, and mechanically, connected to the other sides of said power collectors 51, respectively.

Each electrode layer (the positive electrode layer 52 and the negative electrode layer 53) contains an active material (a positive active material or a negative active material). Further, each electrode layer (the positive electrode layer 52 and the negative electrode layer 53) may contain conductive agent and binder and may also contain, for facilitating the ion-conductivity, inorganic solid electrolyte, high-polymer gel electrolyte, high-polymer solid electrolyte, various additives, or the like.

For example, in the case of a nickel-hydrogen battery, nickel oxide is used as the active material of the positive electrode layer 52, and hydrogen adsorption alloy, which is, for example, $MmNi_{(5-x-y-z)}Al_xMn_yCo_z$ (Mm: misch metal), is used as the active material of the negative electrode layer 53, and the electrolyte layer 55 is formed of a non-woven fabric (which serves as a separator) containing potassium hydroxide as an electrolyte solution.

On the other hand, in the case of a lithium-ion battery, for example, lithium-transition metal composite oxide is used as the active material of the positive electrode layer 52 and carbon is used as the active material of the negative electrode layer 53, and the electrolyte layer 55 is formed of a separator containing a known organic electrolyte solution. The conductive agent may be selected, for example, from among acetylene black, carbon black, graphite, carbon fibers, and carbon nanotubes.

While each battery cell 31 of this example embodiment of the invention is formed in a rectangular shape, it may be formed in various other shapes. For example, each battery cell 31 may be formed in a cylindrical shape. Further, as well as secondary batteries, electric double-layer capacitors (condensers) may be used as the battery cells 31.

Further, while the bipolar electrodes 54 are used in this example embodiment of the invention, other electrodes may alternatively be used. For example, the power generation element 31*a* may be constituted of electrodes each constituted of a power collector on both sides of which positive electrode layers are formed, respectively, and electrodes each constituted of a power collector on both sides of which negative electrode layers are formed, respectively. In this case, the electrodes with the positive electrode layers and the electrodes with the negative electrode layers are alternately stacked on each other with electrolyte layers interposed in in-between.

The power collector 51 is made from, for example, aluminum foils or a plurality of metals (alloys). Further, the power collector 51 may be formed of metal (excluding aluminum) coated with aluminum.

Further, the power collector 51 may be a so-called composite power collector made from metal foils laminated on each other. In this case, aluminum may be used as the material of the power collectors for the positive electrodes, and nickel, copper, or the like, may be used as the material of the power collectors for the negative electrodes. Further, power collectors constituted of positive electrode power collectors and negative electrode power collectors that are arranged so as to contact each other directly and power collectors constituted of positive electrode power collectors and negative electrode power collectors that are stacked each other with conductive layers interposed in-between may alternatively be used.

Figure 4:
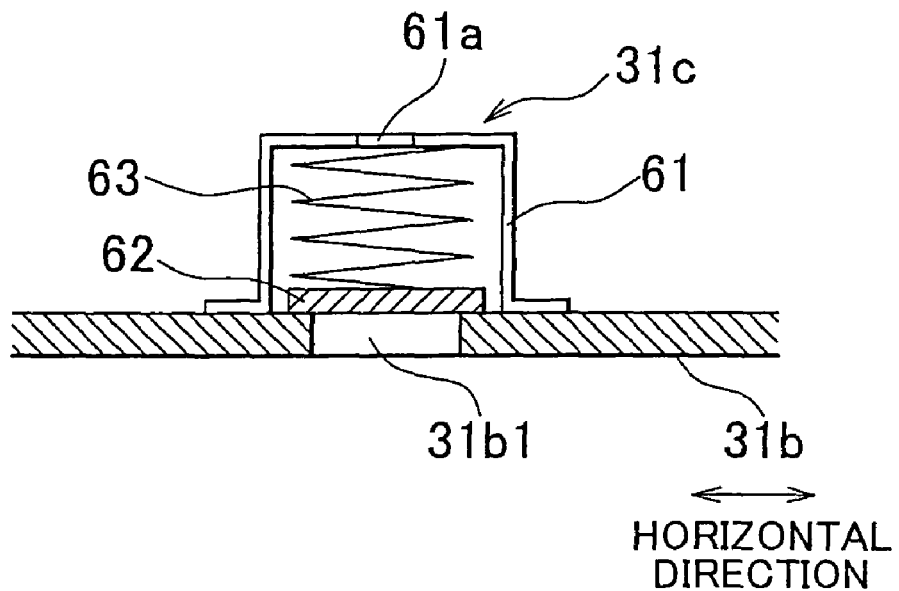
FIG. 4 is a cross-sectional view showing the internal structure of a first valve according to the example embodiment of the invention.

Next, the structure of the first valve 31*c* provided at each battery cell 31 will be described with reference to FIG. 4. FIG. 4 is a cross-sectional view showing the internal structure of the first valve 31*c*.

As will be described in detail later, gas is produced by the power generation element 31*a* in the event of an abnormality of the battery cell 31 (e.g., when the battery cell 31 is overcharged), and in such a case, the first valve 31*c* operates to discharge the gas to the outside (i.e., to the insulative oil 4). The first valve 31*c* is constituted of an exterior member 61 having an opening 61*a*, a lid member 62 for opening and closing an opening 31*b*1 of the battery case 31*b*, and an urging member (spring) 63 urging the lid member 62 toward the opening 31*b*1 side.

The exterior member 61 is fixed on the outer face of the battery case 31*b*. One end of the urging member 63 is fixed to the lid member 62 and the other end is fixed to the inner face of the exterior member 61. The lid member 62 is made of an elastic material (e.g., rubber) so that the lid member 62 tightly contacts the outer face of the battery case 31*b*.

FIG. 4 illustrates a state where the lid member 62 is in contact with the battery case 31*b*, closing the opening 31*b*1 and thus hermetically sealing the interior of the battery case 31*b*. The size of the lid member 62 (the length in the horizontal direction of FIG. 4) is larger than the size of the opening 31*b*1 (the length in the horizontal direction of FIG. 4) but smaller than the size of the exterior member 61 (the length in the horizontal direction of FIG. 4).

As will be described in detail later, the urging force of the urging member 63 is set, for example, such that the lid member 62 moves away from the opening 31*b*1 in response to the internal pressure of the battery cell 31 increasing up to a predetermined value due to the gas produced therein.

More specifically, the urging force of the urging member 63 may be set based on the volume of the gas phase in the battery case 31*b* (the volume excluding that of the power generation element 31*a*) and the amount (volume) of gas that the power generation element 31*a* may produce. For example, in a case where the internal pressure of the battery case 31*b* is considered to increase up to 10 atmospheres due to the gas production in the battery case 31*b*, the urging force of the urging member 63 may be set such that the first valve 31*c* switches from the closed state to the open state in response to the internal pressure of the battery case 31*b* reaching 5 atmospheres (set value).

Figure 5:
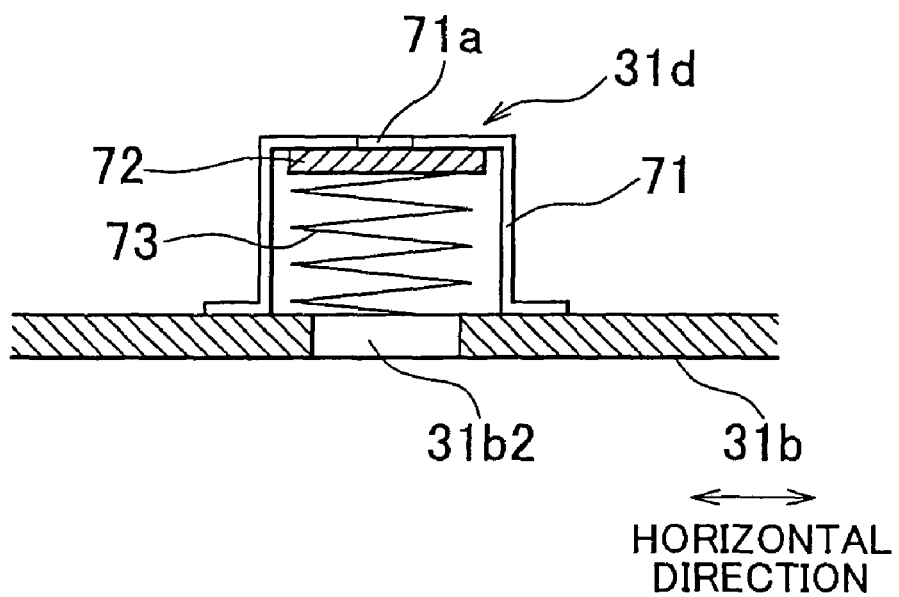
FIG. 5 is a cross-sectional view showing the internal structure of a second valve according to the example embodiment of the invention.

Next, the structure of the second valve 31*d* of the battery cell 31 will be described in detail with reference to FIG. 5. FIG. 5 is a cross-sectional view schematically showing the internal structure of the second valve 31*d*.

As will be mentioned in detail later, the second valve 31*d* of each battery cell 31 switches from the closed state to the open state to allow the insulative oil 4 to enter the battery cell 31 (the battery case 31*b*) when the internal pressure of the battery pack case 2 increases to a certain level. More specifically the second valve 31*d* is constituted of an exterior member 71 having an opening 71*a*, a lid member 72 for opening and closing the opening 71*a*, and an urging member (spring) 73 urging the lid member 72 toward the opening 71*a* side.

The exterior member 71 is fixed on the outer face of the battery case 31*b*. One end of the urging member 73 is fixed to the lid member 72 and the other end is fixed to the outer face of the battery case 31*b*. The lid member 72 is made of an elastic material (e.g., rubber) so that the lid member 72 tightly contacts the inner face of the exterior member 71.

FIG. 5 illustrates a state where the lid member 72 is in contact with the inner face of the exterior member 71, closing the opening 71*a* and thus hermetically sealing the interior of the battery cell 31. The size of the lid member 72 (the length in the horizontal direction of FIG. 5) is larger than the size of the opening 71*a* (the length in the horizontal direction of FIG. 5) but smaller than the size of the exterior member 71 (the length in the horizontal direction of FIG. 5).

As will be described in detail later, the urging force of the urging member 73 is set, for example, such that the lid member 72 moves away from the opening 71*a* in response to the internal pressure of the battery pack case 2 increasing up to a predetermined value due to the gas discharged from the battery cells 31.

More specifically, the urging force of the urging member 73 may be set based on the amount (volume) of gas discharged from the power battery cells 31 and the volume of the insulative oil 4 in the battery pack case 2. For example, in a case where the internal pressure of the battery pack case 2 is considered to increase up to 10 atmospheres due to the gas discharged from the battery cells 31, the urging force of the urging member 73 of each battery cell 31 is set such that the second valve 31*d* switches from the closed state to the open state in response to the internal pressure of the battery pack case 2 reaching 5 atmospheres (set value).

Hereinafter, a description will be made of how the first valves 31*c* and the second valves 31*d* of the respective battery cells 31 of the battery assembly 33 operate when gas is produced at one of the battery cells 31.

First, gas is produced at one of the battery cells 31 of the battery assembly 33 due to overcharging, or the like, and then the internal pressure of the battery case 31*b* of said battery cell 31 increases. That is, because the interior of the battery case 31*b* is hermetically closed in normal state as shown in FIG. 4, the internal pressure of the battery case 31*b* increases as gas is produced.

Then, when the internal pressure of the battery case 31*b* reaches a predetermined value ("first threshold"), the lid member 62 of the first valve 31*c* moves in a direction away from the opening 31*b*1 (upward direction in FIG. 4) against the urging force of the urging member 63, so that the opening 31*b*1 is opened, discharging the gas produced by the power generation element 31a to the outside of the first valve 31c (i.e., into the insulative oil 4) via the opening 31b1 and the opening 61a.

When the internal pressure of the battery case 31b has decreased to a certain level as a result of the gas discharge, the lid member 62 moves back toward the opening 31b1 under the urging force of the urging member 63, whereby the opening 31b1 is closed.

Meanwhile, the internal pressure of the battery pack case 2 increases as gas is discharged into the insulative oil 4 from the battery cell 31 as described above. That is, because the interior of the battery pack case 2 is hermetically closed as mentioned above, the larger the amount of gas in the battery pack case 2, the higher the internal pressure of the battery pack case 2.

When the internal pressure of the battery pack case 2 reaches a predetermined value ("second threshold"), the lid member 72 of the second valve 31d of each battery cell 31 moves in a direction away from the opening 71a (downward direction in FIG. 5) against the urging force of the urging member 73, whereby the opening 71a is opened. At this time, the first valve 31c of each battery cell 31 remains closed as shown in FIG. 4.

Because the pressure at the outside of each battery cell 31 (i.e., the pressure in the battery pack case 2) is higher than the internal pressure of the battery cell 31 at this time, the insulative oil 4 present outside of the battery cell 31 enters the battery cell 31 via the second valve 31d. More specifically, the insulative oil 4 flows through the opening 71a of the second valve 31d and an opening 31b2 of the battery case 31b and then reaches the power generation element 31a in the battery case 31b.

The insulative oil 4 thus reaching the power generation element 31a increases the internal resistance of the power generation element 31a, reducing the current flowing at the power generation element 31a.

If the current at the power generation element 31a is reduced as described above, it reduces the possibility of current flowing between this battery cell 31 and other battery cells located at different positions. As such, even if gas is produced at any battery cell 31, it does not cause gas production at any other battery cells 31.

Further, preventing such chained gas production at other battery cells 31 as described above prevents an excessive increase in the internal pressure of the battery pack case 2. This allows the battery pack case 2 to be formed with a lower strength and thus with a simpler structure (to be lighter in weight). Further, if the structure of the battery pack case 2 is thus simplified, the battery pack 1 may be made more compact in size and lighter in weight.

In this example embodiment of the invention, as described above, when gas is produced from at least one of the battery cells 31, the insulative oil 4 is automatically delivered into other fuel cells 31, suspending the function of the battery pack 1, which establishes a simple but effective fail-safe mode. As such, the above-described structure of the example embodiment of the invention eliminates the need for providing electric components for having such a fail-safe mode (e.g., sensors for detecting gas production).

Because it is not necessary to provide such fail-safe electric components, the battery pack 1 may be more freely arranged in the vehicle. That is, in a case where fail-safe electric components, such as sensors, are provided at the battery pack 1, the battery pack 1 needs to be arranged so as to allow the wires and cables connected to said electric components to be properly arranged in their positions. However, in the structure of the example embodiment of the invention, because such electric components are not used, the battery pack 1 may be arranged without considering such wire and cable arrangements. Therefore, for example, the battery pack 1 may be arranged beneath a seat of the vehicle.

While the first valve 31c and the second valve 31d of the example embodiment of the invention are return valves as shown in FIG. 4 and FIG. 5, they may alternatively be breaker valves. Breaker valves are valves that irreversibly switch from a closed state to an open state.

When breaker valves are used, for example, a first breaker valve which may be regarded as the first valve 31c is provided in each battery cell 31, which switches from the close state to the open state depending upon the pressure difference between the inside and the outside of the battery cell 31 to discharge gas from the battery cell 31 to the outside.

For example, this first breaker valve may be provided as a groove (or a notch) formed in the outer face of the battery case 31b. In this case, the wall thickness of the battery case 31b is smaller at the groove than at other portions, and therefore the battery case 31b breaks at the groove when the internal pressure of the battery case 31b increases up to a certain level, whereby the gas produced therein is discharged to the outside. The dimensions of the groove (e.g., the depth of the groove) are set such that the gas produced in the battery cell 31 may be properly discharged to the outside.

Likewise, a second breaker valve which may be regarded as the second valve 31d may be provided at each battery cell 31, which switches from a closed state to an open state depending upon the pressure difference between the inside and the outside of the battery cell 31 when the internal pressure of the battery pack case 2 increases up to a certain level as a result of the gas discharge from each battery cell 31. When the second breaker valve thus opens, it allows the insulative oil 4 to enter the battery cell 31.

For example, the second breaker valve may be provided as a groove (or a notch) formed in the inner face of the battery case 31b. In this case, the wall thickness of the battery case 31b is smaller at the groove than at other portions, and therefore the battery case 31b breaks at the groove when the pressure of the insulative oil 4 increases up to a certain level, whereby the insulative oil 4 enters the battery case 31b. The dimensions of the groove (e.g., the depth of the groove) are set such that the insulative oil 4 may properly enter the battery cell 31.

One of the two valves at each battery cell 31 may be a return valve and the other may be a breaker valve. Further, even if the above-described breaker valves are used, the advantages obtained in the foregoing example embodiment of the invention may be obtained.

Further, while the first valve 31c and the second valve 31d are provided at each battery cell 31 of the battery assembly 33 in the foregoing example embodiment, the invention is not limited to this. Even if only two of the battery cells 31 have the first valve 31c and the second valve 31d, the foregoing effect may be obtained. In this case, the aforementioned chained gas production may be prevented between the two battery cells 31.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

What is claimed is:

1. A power storage unit, comprising:
   a plurality of power storage modules each constituted of a power generation element which is in a power generation element case containing the power generation element; and
   a power storage unit case containing the power storage modules and an insulative liquid,
   wherein each of at least two of the power storage modules has a first valve that switches from a closed state to an open state when pressure in the power generation element case increases up to a first threshold due to gas produced in the power generation element case, and a second valve that switches from a closed state to an open state when pressure at the outside of the power generation element case increases up to a second threshold due to gas discharged to the outside of the power generation element case.

2. The power storage unit according to claim 1, wherein:
   the first valve switches from the closed state to the open state in response to the pressure in the power generation element case exceeding the pressure at the outside of the power generation element case, and
   the second valve switches from the closed state to the open state in response to the pressure at the outside of the power generation element case exceeding the pressure in the power generation element case.

3. The power storage unit according to claim 1, wherein the second valve switches from the closed state to the open state to allow the insulative liquid to enter the power generation element case.

4. The power storage unit according to claim 1, wherein the power generation element has a positive electrode, a negative electrode, and an electrolyte layer provided between the positive electrode and the negative electrode.

5. The power storage unit according to claim 1, wherein the interior of each power generation element case and the interior of the power storage unit case are hermetically closed.

6. The power storage unit according to claim 1, wherein the first valve is a return valve that switches from the open state to the closed state again.

7. The power storage unit according to claim 6, wherein:
   the first valve has a lid member for opening and closing an opening of the power generation element case and an urging member for urging the lid member toward the opening of the power generation element case; and
   the urging force of the urging member is set such that the lid member moves away from the opening of the power generation element case in response to the pressure in the power generation element case increasing up to the first threshold.

8. The power storage unit according to claim 7, wherein the urging force of the urging member is set based on the volume of gas phase in the power generation element case and the volume of gas that the power generation element may produce.

9. The power storage unit according to claim 1, wherein the second valve is a return valve that switches from the open state to the closed state again.

10. The power storage unit according to claim 9, wherein:
    the second valve has an exterior member having an opening, a lid member for opening and closing the opening of the exterior member, and an urging member for urging the lid member toward the opening of the exterior member; and
    the urging force of the urging member is set such that the lid member moves away from the opening of the exterior member in response to the pressure at the outside of the power generation element case increasing up to the second threshold.

11. The power storage unit according to claim 10, wherein the urging force of the urging member is set based on the volume of gas discharged from the power generation modules and the volume of the insulative liquid in the power storage unit case.

12. A vehicle incorporating the power storage unit according to claim 1.

* * * * *